United States Patent
Lipcsei et al.

(10) Patent No.: US 7,391,191 B2
(45) Date of Patent: Jun. 24, 2008

(54) SWITCHING RESISTANCE LINEAR REGULATOR ARCHITECTURE

(75) Inventors: Laszlo Lipcsei, Campbell, CA (US); Serban Popescu, Campbell, CA (US); ChengHwa Teh, Singapore (SG)

(73) Assignee: O2 Micro International Limited, Grand Cayman (KY)

( * ) Notice: Subject to any disclaimer, the term of this patent is extended or adjusted under 35 U.S.C. 154(b) by 0 days.

(21) Appl. No.: 11/542,454

(22) Filed: Oct. 2, 2006

(65) Prior Publication Data

US 2008/0079403 A1    Apr. 3, 2008

(51) Int. Cl.
*G05F 1/59*    (2006.01)
*G05F 1/613*    (2006.01)

(52) U.S. Cl. .................. 323/272; 323/284; 323/285

(58) Field of Classification Search .............. 323/224, 323/225, 272, 282, 284, 285
See application file for complete search history.

(56) References Cited

U.S. PATENT DOCUMENTS

| | | | |
|---|---|---|---|
| 6,433,521 B1 | 8/2002 | Chen et al. | 323/244 |
| 6,975,494 B2 * | 12/2005 | Tang et al. | 361/64 |

* cited by examiner

*Primary Examiner*—Gary L Laxton

(57) ABSTRACT

A switching resistance linear regulator. The regulator comprises an output terminal producing a regulated output voltage, a first comparator, a second comparator, a first sourcing circuit coupled to the output terminal, and a first sinking circuit coupled to the output terminal. The first comparator compares a feedback signal representative of the output voltage and a first sourcing reference signal that is less than a reference signal. The second comparator compares the feedback signal and a first sinking reference signal that is greater than the reference signal. The first sourcing circuit is configured to be responsive to the first comparator by sourcing a first current to the output terminal. The first sinking circuit is configured to be responsive to the second comparator by sinking a second current from the output terminal.

11 Claims, 4 Drawing Sheets

SWITCHING RESISTANCE LINEAR REGULATOR ARCHITECTURE

TECHNICAL FIELD

This invention relates to a linear regulator, and more particularly to a switching resistance linear regulator.

BACKGROUND ART

Conventional linear regulator is accomplished by the linear regulation of the pass element (e.g., MOSFET). The pass element is used as one half of a potential divider to control the output voltage. A feedback circuit compares the output voltage to a reference voltage in order to adjust the input to the pass element, thus keeping the output voltage reasonably constant. The pass element operates in its "linear region" and acts like a variable resistor. The pass element continuously adjusts a voltage divider network to maintain a constant output voltage.

However, the linear regulation of the pass element faces stability issues due to wide load requirements. The pass element used in the conventional method is scaled based on load requirements, which will constitute an internal pole. Therefore, the output pole which shifts with the load current would compromise the stability issue as it moves too close to the internal pole of the conventional linear regulator. In other words, the regulator stability becomes an issue because of the interaction of this internal pole with the pole at the regulator's output.

There are a lot of existing methods for voltage regulators. Virtually, all of these existing methods deal with the tough constraints imposed by the use of the pass element, which usually gives an internal pole.

In that sense, any regulator with the pass element having amplification (e.g. a common-source connected PMOS) will have issues with the loop stability. Thus, stability is among the most difficult issues to address in traditional linear regulators.

SUMMARY OF THE INVENTION

The present invention provides a switching resistance linear regulator, in accordance with one embodiment of the present invention. The regulator comprises an output terminal producing a regulated output voltage, a first comparator, a second comparator, a first sourcing circuit coupled to the output terminal, and a first sinking circuit coupled to the output terminal. The first comparator receives a feedback signal representative of the output voltage and receives a first sourcing reference signal that is less than a reference signal. The first comparator generates a first comparative signal when the feedback signal is less than the first sourcing reference signal. The second comparator receives the feedback signal and a first sinking reference signal that is greater than the reference signal. The second comparator generates a second comparative signal when the feedback signal is greater than the first sinking reference signal. The first sourcing circuit is configured to be responsive to the first comparative signal by sourcing a first current to the output terminal. The first sinking circuit is configured to be responsive to the second comparative signal by sinking a second current from the output terminal.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DESCRIPTION OF EMBODIMENTS

Reference will now be made in detail to the embodiments of the present invention, switching resistance linear regulator architecture. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
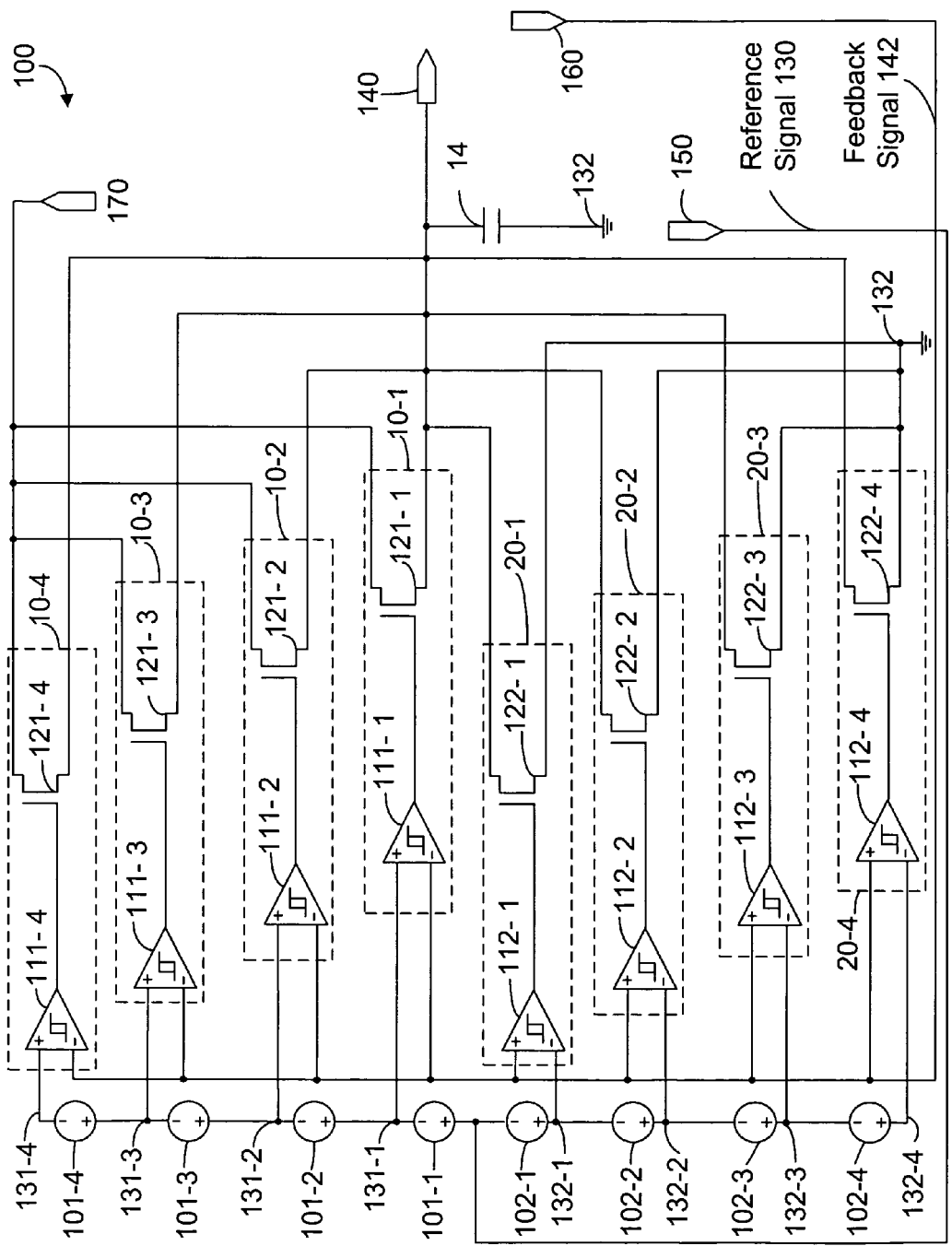
FIG. 1 is a block diagram of a switching resistance linear regulator, in accordance with one embodiment of the present invention.

Referring to FIG. 1, a block diagram of a switching resistance linear regulator 100, in accordance with one embodiment of the present invention is shown. The switching resistance linear regulator 100 comprises an output terminal 140 for producing a regulated output voltage, a first comparator 111-1, a second comparator 112-1, a first sourcing circuit 121-1, and a first sinking circuit 122-1.

The regulator 100 further comprises a feedback terminal 160 receiving a feedback signal 142 and a reference terminal 150 receiving a reference signal 130. The feedback signal 142 represents the output voltage from the output terminal 140.

In general, the regulator 100 regulates its output towards the reference signal. In FIG. 1, when the feedback signal 142 is less than a certain amount of the reference signal 130, the first sourcing circuit 121-1 will be switched on to source current to the output terminal 140 of the regulator 100. Conversely, when the feedback signal 142 is greater than a certain amount of the reference signal 130, the first sinking circuit 122-1 will be switched on to sink current from the output terminal 140 of the regulator 100.

In one embodiment, the first comparator 111-1 and the first sourcing circuit, shown as the sourcing switch 121-1, establish the first sourcing stage 10-1.

The first comparator 111-1 receives a feedback signal 142 at its negative terminal and receives a first sourcing reference signal 131-1 that is less than the reference signal 130 at its positive terminal. The first comparator 111-1 generates a first comparative signal when the feedback signal 142 is less than the first sourcing reference signal 131-1.

The first sourcing circuit shown as the sourcing switch 121-1 is coupled to the output terminal 140. The sourcing switch 121-1 is responsive to the first comparative signal from the first comparator 111-1 by sourcing a first current to the output terminal 140.

In one embodiment, the second comparator 112-1 and the first sinking circuit shown as the sinking switch 122-1 establish the first sinking stage 20-1.

The second comparator 112-1 receives the feedback signal 142 at its positive terminal and a first sinking reference signal 132-1 that is greater than the reference signal 130 at its negative terminal. The second comparator 112-1 generates a second comparative signal when the feedback signal 142 is greater than the first sinking reference signal 132-1.

The first sinking circuit shown as the sinking switch 122-1 is also coupled to the output terminal 140. The sinking switch 122-1 is responsive to the second comparative signal from the second comparator 112-1 by sinking a second current from the output terminal 140.

As described above, the first sourcing stage 10-1 sources current to the output terminal 140 when the feedback signal is less than the first sourcing reference signal 131-1. The first sinking stage 20-1 sinks current from the output terminal 140 when the feedback signal is greater than the first sinking reference signal 132-1.

In one embodiment of the present invention, the regulator 100 further comprises comparators 111-2, 111-3, and 111-4, and sourcing circuits shown as sourcing switches 121-2, 121-3, and 121-4.

More specifically, comparator 111-2 and sourcing switch 121-2 establish the second sourcing stage 10-2. Comparator 111-3 and sourcing switch 121-3 establish the third sourcing stage 10-3. Comparator 111-4 and sourcing switch 121-4 establish the fourth sourcing stage 10-4. Since sourcing stages 10-2, 10-3 and 10-4 comprise similar elements as sourcing stage 10-1, repetitive description will not be made herein for purposes of brevity and clarity.

The second sourcing stage 10-2 sources current to the output terminal 140 when the feedback signal 142 is less than the sourcing reference signal 131-2. The third sourcing stage 10-3 sources current to the output terminal 140 when the feedback signal 142 is less than the sourcing reference signal 131-3. The fourth sourcing stage 10-4 sources current to the output terminal 140 when the feedback signal 142 is less than the sourcing reference signal 131-4.

In one embodiment, sourcing reference signals 131-1, 131-2, 131-3, and 131-4 are decreasing accordingly. Therefore, the as the strength of the feedback signal 142 lessens when compared to the reference signal 130, more sourcing stages will be switched on in a corresponding fashion to source current to the output terminal 140.

In one embodiment of the present invention, the regulator 100 further comprises comparators 112-2, 112-3, and 112-4, and sinking circuits shown as sinking switches 122-2, 122-3, and 122-4.

More specifically, comparator 112-2 and sinking switch 122-2 establish the second sinking stage 20-2. Comparator 112-3 and sinking switch 122-3 establish the third sinking stage 20-3. Comparator 112-4 and sinking switch 122-4 establish the fourth sinking stage 20-4. Since sinking stages 20-2, 20-3 and 20-4 comprise similar elements as in sinking stage 20-1, repetitive description will not be made herein for purposes of brevity and clarity.

The second sinking stage 20-2 sinks current from the output terminal 140 when the feedback signal 142 is greater than the sinking reference signal 132-2. The third sinking stage 20-3 sinks current from the output terminal 140 when the feedback signal 142 is greater than the sinking reference signal 132-3. The fourth sinking stage 20-4 sinks current from the output terminal 140 when the feedback signal 142 is greater than the sinking reference signal 132-4.

In one embodiment, sinking reference signals 132-1, 132-2, 132-3, and 132-4 are increasing accordingly. Therefore, as the strength of the feedback signal 142 increases when compared to the reference signal 130, more sinking stages will be switched on in a corresponding fashion to sink current from the output terminal 140.

It will be appreciated by one skilled in the art that any number of sourcing stages and any number of sinking stages may be included in the regulator 100, which depends on system needs. In addition, in another embodiment, the number of sourcing stages and the number of sinking stages are not identical.

The regulator 100 further comprises a first offset voltage generator 101-1 and a second offset voltage generator 102-1, in one embodiment.

The first offset voltage generator 101-1 is coupled between the reference terminal 150 and the first comparator 111-1. More specifically, the first offset voltage generator 101-1 is coupled between the reference terminal 150 and positive terminal of the first comparator 111-1. As a result, the first sourcing reference signal 131-1 comprises the reference signal 130 less a first offset voltage (e.g., 5 mV) from the first offset voltage generator 101-1. In one embodiment, the first sourcing reference signal 131-1 is equal to the reference signal 130 less the first offset voltage from the first offset voltage generator 101-1.

The second offset voltage generator 102-1 is coupled between the reference terminal 150 and the second comparator 112-1. More specifically, the second offset voltage generator 102-1 is coupled between the reference terminal 150 and the negative terminal of the second comparator 112-1. As a result, the first sinking reference signal 132-1 comprises the reference signal 130 added to a second offset voltage (e.g., 5 mV) from the second offset voltage generator 102-1. In one embodiment, the first sinking reference signal 132-1 is equal to the reference signal 130 added to the second offset voltage from the second offset voltage generator 102-1.

The regulator 100 further comprises offset voltage generators 101-2, 101-3, and 101-4, in one embodiment.

Specifically, the offset voltage generator 101-2 is coupled between the first comparator 111-1 and the comparator 111-2. In particular, the offset voltage generator 101-2 is coupled between the positive terminal of the first comparator 111-1 and the positive terminal of the comparator 111-2. As a result, the second sourcing reference signal 131-2 comprises the first sourcing reference signal 131-1 less an offset voltage (e.g., 5 mV) from the offset voltage generator 101-2. In one embodiment, the second sourcing reference signal 131-2 is equal to the first sourcing reference signal 131-1 less the offset voltage from the offset voltage generator 101-2.

Offset voltage generators 101-3 and 101-4 have similar functions as the offset voltage generator 101-2 and will not be repetitively described herein for purposes of brevity and clarity. As such, the voltage of the sourcing reference signal 131-3 is equal to the sourcing reference signal 131-2 less the offset voltage from the offset voltage generator 101-3. The voltage of the sourcing reference signal 131-4 is equal to the sourcing reference signal 131-3 less the offset voltage from the offset voltage generator 101-4.

In one embodiment, offset voltage generators 101-1, 101-2, 101-3, and 101-4 have the same offset voltage (e.g., 5 mV). It will be appreciated by one skilled in the art that offset voltage generators in the regulator 100 may have different offset voltages, in other embodiments of the present invention.

The regulator 100 further comprises offset voltage generators 102-2, 102-3, and 102-4.

Specifically, the offset voltage generator 102-2 is coupled between the comparator 112-1 and the comparator 112-2. In particular, the offset voltage generator 102-2 is coupled between the negative terminal of the comparator 112-1 and the negative terminal of the comparator 112-2. As a result, the second sinking reference signal 132-2 comprises the first sinking reference signal 132-1 summed with an offset voltage (e.g., 5 mV) from the offset voltage generator 102-2. In one embodiment, the second sinking reference signal 132-2 is equal to the first sinking reference signal 132-1 summed with the offset voltage from the offset voltage generator 102-1.

Offset voltage generators 102-3 and 102-4 have similar functions as the offset voltage generator 102-2 and will not be repetitively described herein for purposes of brevity and clarity. As such, the voltage of the sinking reference signal 132-3 is equal to the sinking reference signal 132-2 summed with the offset voltage from the offset voltage generator 102-3. The voltage of the sinking reference signal 132-4 is equal to the sinking reference signal 132-3 summed with the offset voltage from the offset voltage generator 102-4.

In one embodiment, offset voltage generators 102-1, 102-2, 102-3, and 102-4 have the same offset voltage (e.g., 5 mV). It will be appreciated by one skilled in the art that offset voltage generators in the regulator 100 may have different offset voltages, in other embodiments of the present invention.

Detailed description will now be made to sourcing stages 10-1, 10-2, 10-3 and 10-4, and sinking stages 20-1, 20-2, 20-3 and 20-4, in accordance with embodiments of the present invention. Since sourcing stages 10-1, 10-2, 10-3 and 10-4 have similar elements and functions, detailed description will be made to sourcing stage 10-1 for purposes of brevity and clarity as representative of the elements and functions of all sourcing stages 10-1, 10-2, 10-3 and 10-4.

In the first sourcing stage 10-1, the first sourcing circuit, shown as the sourcing switch 121-1, selectively provides a first constant sourcing resistance for sourcing current to the output terminal 140. The sourcing switch 121-1 is switched on by the first comparative signal from the comparator 111-1. Furthermore, the first sourcing circuit is coupled between a supply voltage 170 and the output terminal 140.

As described above, the sourcing switch 121-1 (e.g., a transistor) is responsive to the first comparative signal from the first comparator 111-1. More specifically, the sourcing switch 121-1 is fully turned on when it receives a high comparative signal from the first comparator 111-1. Once the sourcing switch 121-1 is fully turned on, the internal resistance of the sourcing switch 121-1 is present between the supply voltage 170 and the output terminal 140. The internal resistance of the sourcing switch 121-1 remains constant and sources current to the output terminal 140.

Since sinking stages 20-1, 20-2, 20-3 and 20-4 have similar elements and functions, detailed description will be made to sinking stage 20-1 for purposes of brevity and clarity as representative of the elements and functions of all sinking stages 20-1, 20-2, 20-3 and 20-4.

In the first sinking stage 20-1, the first sinking circuit shown as the sinking switch 122-1 selectively provides a first constant sinking resistance for sinking current from the output terminal 140. The sinking switch 122-1 is switched on by the second comparative signal from the comparator 112-1. Furthermore, the first sinking circuit is coupled between a ground 132 and the output terminal 140.

As described above, the sinking switch 122-1 (e.g., a transistor) is responsive to the second comparative signal from the second comparator 112-1. More specifically, the sinking switch 122-1 is fully turned on when it receives a high comparative signal from the second comparator 112-1. Once the sinking switch 122-1 is fully turned on, the internal resistance of the sinking switch 122-1 is present between the ground 132 and the output terminal 140. The internal resistance of the sinking switch 122-1 remains constant and sinks current from the output terminal 140.

In FIG. 1, the regulator 100 further comprises a capacitor 14 coupled between the output terminal 140 and ground 132. The capacitor 14 is configured to smooth the regulated output voltage at output terminal 140.

As described above, in one embodiment, each sourcing switch 121-1, 121-2, 121-3 and 121-4 comprises a non-ideal switch having an internal resistance, such as a transistor in FIG. 1. Also, in one embodiment, each sinking switch 122-1, 122-2, 122-3 and 122-4 comprises a non-ideal switch having an internal resistance, such as a transistor in FIG. 1.

However, other modifications could be made to the regulator 100 in the present invention, in accordance with other embodiments of the present invention. For example, the sourcing/sinking switch in the present invention can comprise an ideal switch in series with a resistor in one embodiment. Description for some of these embodiments will be made with respect to the first sourcing stage 10-1 and the first sinking stage 20-1 in relation to FIG. 2 and FIG. 3.

Figure 2:
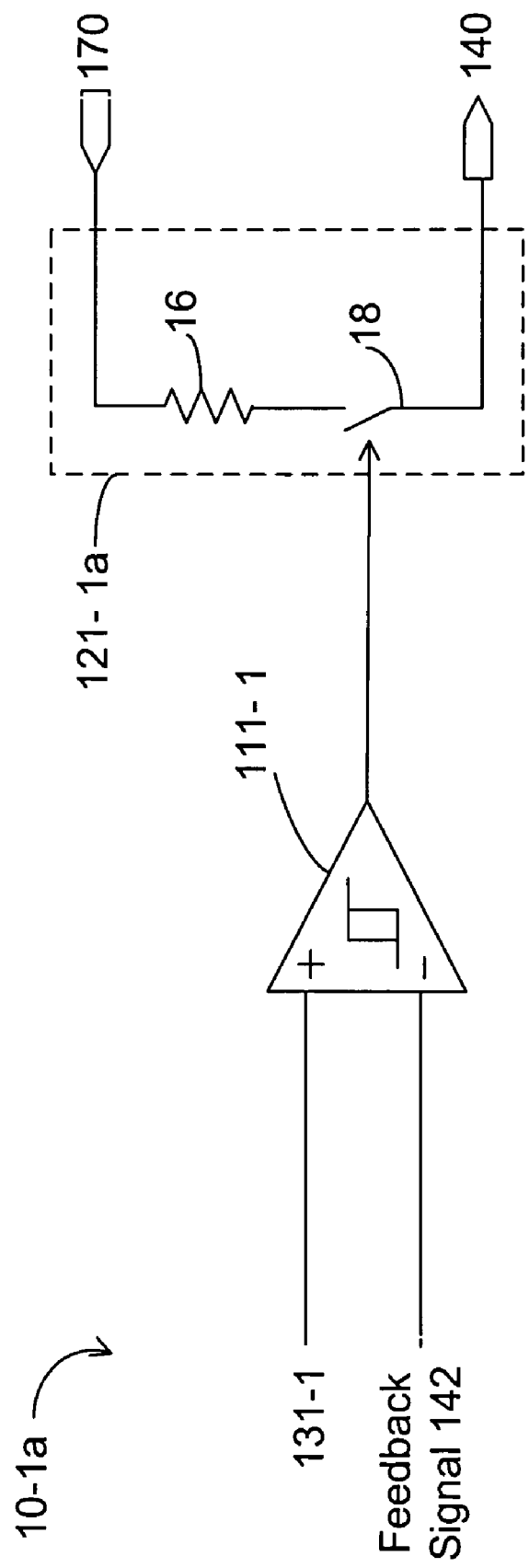
FIG. 2 is another circuit diagram of the sourcing stage in FIG. 1, in accordance with one embodiment of the present invention.

FIG. 2 shows another circuit diagram of the first sourcing stage 10-1a, in accordance with one embodiment of the present invention. Elements that are labeled the same as in FIG. 1 have similar functions and will not be repetitively described herein for purposes of brevity and clarity.

In one embodiment, the sourcing switch 121-a comprises an ideal switch 18 (e.g., a relay) in series with a constant resistor 16. Once the ideal switch 18 is turned on, the constant resistor 16 provides the constant sourcing resistance between the supply voltage 170 and the output terminal 140 to source current to the output terminal 140.

Figure 3:
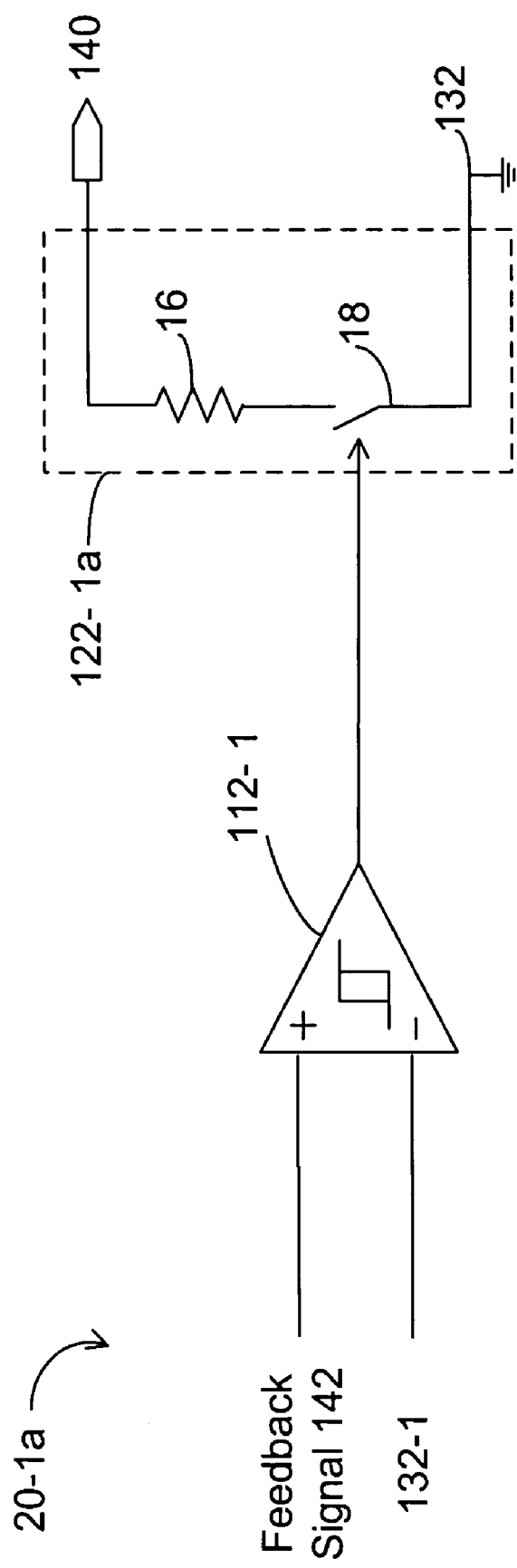
FIG. 3 is another circuit diagram of the sinking stage in FIG. 1, in accordance with one embodiment of the present invention.

FIG. 3 shows another circuit diagram of the first sinking stage 20-1a, in accordance with one embodiment of the present invention. Elements that are labeled the same as in FIG. 1 have similar functions and will not be repetitively described herein for clarity.

In one embodiment, the sinking switch 122-1a comprises an ideal switch 18 (e.g., a relay) in series with a constant resistor 16. Once the ideal switch 18 is turned on, the constant resistor 16 provides the constant sinking resistance between the ground 132 and the output terminal 140 to sink current from the output terminal 140.

Overall, FIG. 2 provides an alternative configuration for each sourcing stage 10-1, 10-2, 10-3, and 10-4 in FIG. 1. FIG. 3 provides an alternative configuration for each sinking stage 20-1, 20-2, 20-3, and 20-4 in FIG. 1.

Referring back to FIG. 1, during operation the regulator 100 compares the feedback signal 142 with the reference signal 130. If the feedback signal 142 is less than the reference signal 130, the regulator 100 will switch on different sourcing stages 10-1, 10-2, 10-3, and 10-4 to source current to the output terminal 140 based on the difference between the feedback signal 142 and the reference signal 130. Conversely, if the feedback signal 142 is greater than the reference signal 130, the regulator 100 will switch on different sinking stages 20-1, 20-2, 20-3, and 20-4 to sink current from the output terminal 140 based on the difference between the feedback signal 142 and the reference signal 130. As such, the regulator 100 regulates its output voltage at the output terminal 140 in relation to the reference signal 130.

In addition, the output voltage at the output terminal 140 is smoothed by charging/discharging the capacitor 14, in one embodiment.

More specifically, each comparator in each sourcing/sinking stage compares the feedback signal 142 with its own reference signal and switches on the corresponding sourcing/sinking circuit.

In the first sourcing stage 10-1, comparator 111-1 compares the feedback signal 142 with a first sourcing reference signal 131-1 that is less than the reference signal 130. The comparator 111-1 generates a first comparative signal when the feedback signal 142 is less than the first sourcing reference signal 131-1.

The corresponding non-ideal sourcing switch 121-1 is switched on in response to the first comparative signal. Therefore, the internal resistance of the sourcing switch 121-1 coupled between the supply voltage 170 and the output terminal 140 sources current to the output terminal 140 from the supply voltage 170.

In another configuration of the first sourcing stage 10-1a in FIG. 2, comparator 111-1 compares the feedback signal 142 with a first sourcing reference signal 131-1 that is less than the reference signal 130. The comparator 111-1 generates a first comparative signal when the feedback signal 142 is less than the first sourcing reference signal 131-1.

The corresponding ideal switch 18 in the sourcing switch 121-1a is switched on in response to the first comparative signal. Therefore, the resistance 16 in the sourcing switch 121-1a coupled between the supply voltage 170 and the output terminal 140 sources current to the output terminal 140 from the supply voltage 170.

Referring back to FIG. 1, in addition, the first sourcing reference signal 131-1 is obtained by negatively offsetting the reference signal 130 by a first offset voltage (e.g., 5 mV) from the offset voltage generator 101-1 in one embodiment.

Other sourcing stages 10-2, 10-3 and 10-4 operate similarly as the sourcing stage 10-1 and will not be repetitively described herein for purposes of brevity and clarity as sourcing stage 10-1 is representative of the elements and functions of all sourcing stages 10-1, 10-2, 10-3 and 10-4. Overall, as the strength of the feedback signal 142 lessens when compared to the reference signal 130, more sourcing stages will be switched on in a corresponding fashion to source current to the output terminal 140. Detailed operation will be described in relation to FIG. 4.

In the first sinking stage 20-1, comparator 112-1 compares the feedback signal 142 with a first sinking reference signal 132-1 that is greater than the reference signal 130. The comparator 112-1 generates a second comparative signal when the feedback signal 142 is greater than the first sinking reference signal 132-1.

The corresponding non-ideal sinking switch 122-1 is switched on in response to the second comparative signal. Therefore, the internal resistance of the sinking switch 122-1 coupled between the ground 132 and the output terminal 140 sinks current from the output terminal 140 to the ground 132.

In another configuration of the first sinking stage 20-1a in FIG. 3, comparator 112-1 compares the feedback signal 142 with a first sinking reference signal 132-1 that is greater than the reference signal 130. The comparator 112-1 generates a second comparative signal when the feedback signal 142 is greater than the first sinking reference signal 132-1.

The corresponding ideal switch 18 in the sinking switch 122-1a is switched on in response to the second comparative signal. Therefore, the resistance 16 in the sinking switch 122-1a coupled between the ground 132 and the output terminal 140 sinks current from the output terminal 140 to ground 132.

Referring back to FIG. 1, in addition, the first sinking reference signal 132-1 is obtained by positively offsetting the reference signal 130 by a second offset voltage (e.g., 5 mV) from the offset voltage generator 102-1 in one embodiment.

Other sinking stages 20-2, 20-3 and 20-4 operate similarly as the sinking stage 20-1 and will not be repetitively described herein for purposes of brevity and clarity as sinking stage 20-1 is representative of the elements and functions of all sinking stages 20-1, 20-2, 20-3 and 20-4. Overall, as the strength of the feedback signal 142 increases when compared to the reference signal 130, more sinking stages will be switched on in a corresponding fashion to sink current from the output terminal 140. Detailed operation will be described in relation to FIG. 4.

Figure 4:
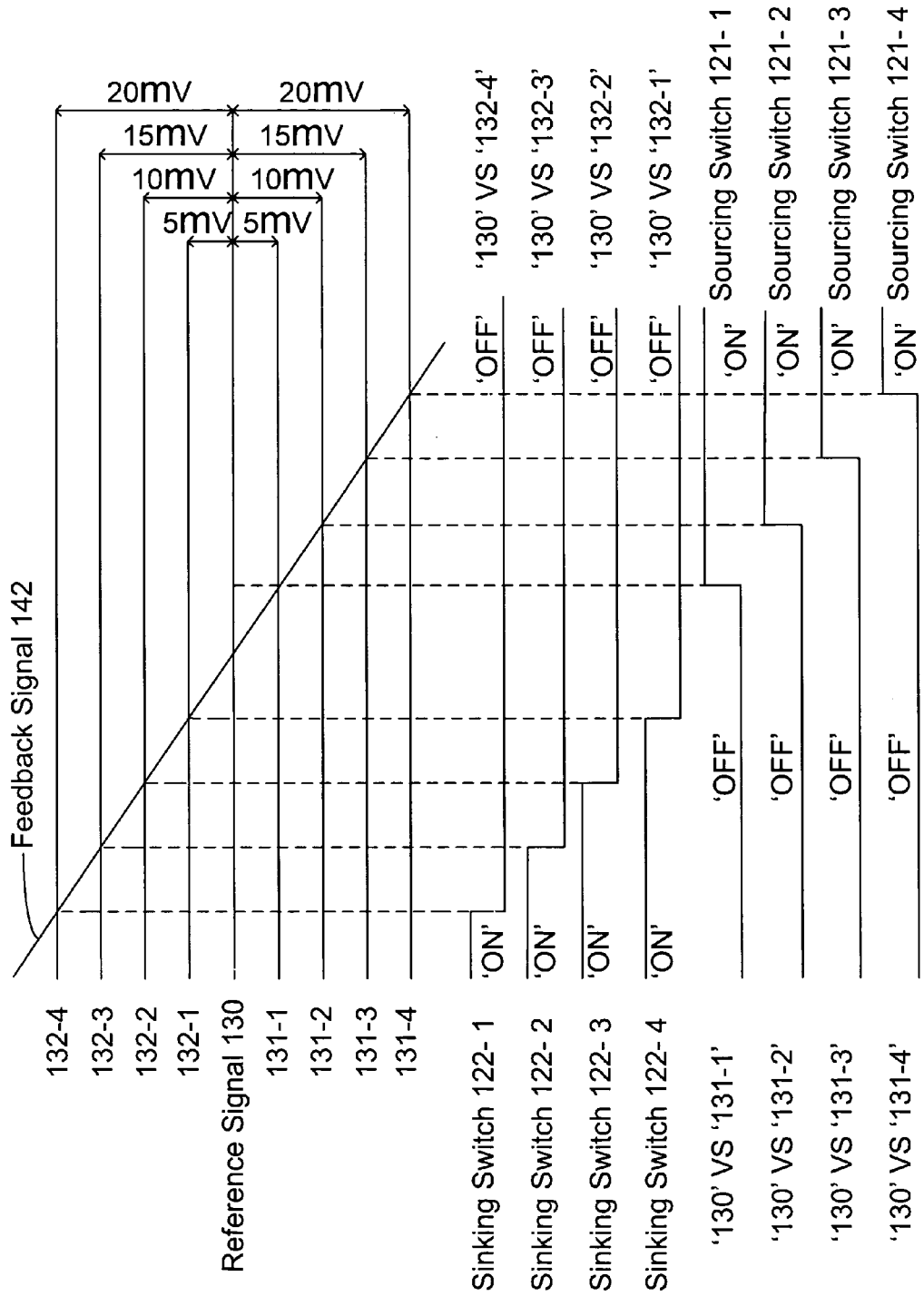
FIG. 4 is a waveform illustrating the status of sinking and sourcing switches during the operation, in accordance with one embodiment of the present invention.

Referring to FIG. 4, a waveform illustrating the status of sinking and sourcing switches during the operation of the regulator 100 in FIG. 1, in accordance with one embodiment of the present invention is shown.

In FIG. 1, all offset voltage generators have the same offset voltage, which is 5 mV, in one embodiment. It will be appreciated by one skilled in the art that the any offset voltage generator with any offset voltage or any combinations of different offset voltage generators may be included, in accordance with other embodiments in the present invention. As shown in FIG. 2, the sinking reference signal 132-1 is equal to the sum of the reference signal 130 and the offset voltage of 5 mV. The sinking reference signal 132-2 is equal to the sum of the reference signal 130 and the total offset voltage of 10 mV. The sinking reference signal 132-3 is equal to the sum of the reference signal 130 and the total offset voltage of 15 mV. The sinking reference signal 132-4 is equal to the sum of the reference signal 130 and the total offset voltage 20 mV.

The sourcing reference signal 131-1 is equal to the difference between the reference signal 130 and the offset voltage 5 mV. The sourcing reference signal 131-2 is equal to the difference between the reference signal 130 and the total offset voltage 10 mV. The sourcing reference signal 131-3 is equal to the difference between the reference signal 130 and the total offset voltage 15 mV. The sourcing reference signal 131-4 is equal to the difference between the reference signal 130 and the total offset voltage 20 mV.

In FIG. 4, in general, the status of the sinking/sourcing switch is shown as 'ON' and 'OFF', in one embodiment. In one specific embodiment, when the status of the sinking/sourcing switch is '1', it indicates the corresponding sinking/sourcing switch is switched on. When the status of the sinking/sourcing switch is '0', it indicates the corresponding sinking/sourcing switch is switched off.

When the feedback signal 142 is less than the sourcing reference signal 131-1, sourcing switch 121-1 will be switched on. When the feedback signal 142 is less than the sourcing reference signal 131-2, sourcing switches 121-1 and 121-2 will be switched on. When the feedback signal 142 is less than the sourcing reference signal 131-3, sourcing switches 121-1, 121-2, and 121-3 will be switched on. When the feedback signal 142 is less than the sourcing reference signal 131-4, sourcing switches 121-1, 121-2, 121-3, and 121-4 will be switched on.

Referring back to FIG. 1, if the total resistance between the supply voltage 170 and the output terminal 140 is $R_{sourcing}$, the supply voltage 170 is $V_{170}$, and the voltage at the output terminal 140 is $V_{140}$, then the total sourcing current to the output terminal 140 is: $I_{sourcing} = (V_{170} - V_{140})/R_{sourcing}$. As discussed above, the less the feedback signal 142, the more the sourcing switches will be switched on. As such, more resistance will be coupled in parallel between the supply voltage 170 and the output terminal 140. In other words, the total resistance $R_{sourcing}$ will be smaller. As a result, the less the feedback signal 142, the greater the total sourcing current $I_{sourcing}$ will flow to the output terminal 140. Therefore, the voltage at the output terminal 140 will be increased towards the reference signal 130 accordingly.

Referring back to FIG. 4, when the feedback signal 142 is greater than the sinking reference signal 132-1, sinking switch 122-1 will be switched on. When the feedback signal 142 is greater than the sinking reference signal 132-2, sinking switches 122-1 and 122-2 will be switched on. When the feedback signal 142 is greater than the sinking reference signal 132-3, sinking switches 122-1, 122-2, and 122-3 will be switched on. When the feedback signal 142 is greater than the sinking reference signal 132-4, sinking switches 122-1, 122-2, 122-3, and 122-4 will be switched on.

Referring back to FIG. 1, if the total resistance between the ground 132 and the output terminal 140 is $R_{sinking}$, and the voltage at the output terminal 140 is $V_{140}$, then the total sinking current from the output terminal 140 is: $I_{sinking} = V_{140}/R_{sinking}$. As discussed above, the greater the feedback signal 142, the more the sinking switches will be switched on. As such, more resistance will be coupled in parallel between the ground 132 and the output terminal 140. In other words, the total resistance $R_{sinking}$ will be smaller. As a result, the greater the feedback signal 142, the greater the total sourcing current $I_{sinking}$ will flow from the output terminal 140 to the ground 132. Therefore, the voltage at the output terminal 140 will be decreased towards the reference signal 130 accordingly.

Accordingly, the present invention provides a switching resistance linear regulator with high sinking and sourcing capability. The regulator in the present invention eliminates the use of the pass element by switching on different resistance. Therefore, the regulator in the present invention is stable over wide sourcing and sinking current range.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A regulator comprising:
   an output terminal producing a regulated output voltage;
   a main reference terminal receiving a main reference signal;
   a first offset voltage generator coupled to said main reference terminal, wherein said first offset voltage generator generates a first offset voltage;
   a second offset voltage generator coupled to said main reference terminal, wherein said second offset voltage generator generates a second offset voltage;
   a third offset voltage generator coupled to said first offset voltage generator, wherein said third offset voltage generator generates a third offset voltage;
   a fourth offset voltage generator coupled to said second offset voltage generator, wherein said fourth offset voltage generator generates a fourth offset voltage;
   a first comparator receiving a feedback signal representative of said output voltage and receiving a first sourcing reference signal from said first offset voltage generator, wherein said first comparator generates a first comparative signal when said feedback signal is less than said first sourcing reference signal, wherein said first sourcing reference signal comprises said main reference signal less said first offset voltage;
   a second comparator receiving said feedback signal and receiving a first sinking reference signal from said second offset voltage generator, wherein said second comparator generates a second comparative signal when said feedback signal is greater than said first sinking reference signal, wherein said first sinking reference signal comprises said main reference signal added to said second offset voltage;
   a third comparator receiving said feedback signal and receiving a second sourcing reference signal from said third offset voltage generator, wherein said third comparator generates a third comparative signal when said feedback signal is less than said second sourcing reference signal, wherein said second sourcing reference signal comprises said first sourcing reference signal less said third offset voltage;
   a fourth comparator receiving said feedback signal and a second sinking reference signal from said fourth offset voltage generator, wherein said fourth comparator generates a fourth comparative signal when said feedback signal is greater than said second sinking reference signal, wherein said second sinking reference signal comprises said first sinking reference signal added to said fourth offset voltage;
   a first sourcing circuit coupled to said output terminal configured to be responsive to said first comparative signal by sourcing a first current to said output terminal;
   a first sinking circuit coupled to said output terminal configured to be responsive to said second comparative signal by sinking a second current from said output terminal;
   a second sourcing circuit coupled to said output terminal configured to be responsive to said third comparative signal by sourcing a third current to said output terminal; and
   a second sinking circuit coupled to said output terminal configured to be responsive to said fourth comparative signal and by sinking a fourth current from said output terminal.

2. The regulator as claimed in claim 1, wherein said first sourcing circuit comprises a first sourcing switch for selectively providing a first constant sourcing resistance for sourcing said first current to said output terminal, and wherein said first sourcing switch is switched on by said first comparative signal.

3. The regulator as claimed in claim 2, wherein said first sourcing switch comprises a relay coupled to said first constant sourcing resistance.

4. The regulator as claimed in claim 2, wherein said second sourcing circuit comprises a second sourcing switch for selectively providing a second constant sourcing resistance for sourcing said third current to said output terminal, and wherein said second sourcing switch is switched on by said third comparative signal.

5. The regulator as claimed in claim 4, wherein said second sourcing switch comprises a relay coupled to said second constant sourcing resistance.

6. The regulator as claimed in claim 1, wherein said first sinking circuit comprises a first sinking switch for selectively providing a first constant sinking resistance for sinking said second current from said output terminal, and wherein said first sinking switch is switched on by said second comparative signal.

7. The regulator as claimed in claim 6, wherein said first sinking switch comprises a relay coupled to said first constant sinking resistance.

8. The regulator as claimed in claim 6, wherein said second sinking circuit comprises a second sinking switch for selectively providing a second constant sinking resistance for sinking said fourth current from said output terminal, and wherein said second sinking switch is switched on by said fourth comparative signal.

9. The regulator as claimed in claim 8, wherein said second sinking switch comprises a relay coupled to said second constant sinking resistance.

10. The regulator as claimed in claim 1, wherein said first sourcing circuit is coupled to a supply voltage and said first sinking circuit is coupled to ground.

11. The regulator as claimed in claim 10, further comprising:
    a capacitor coupled between said output terminal and said ground, wherein said capacitor is configured to smooth said regulated output voltage.

* * * * *